S. B. BROWN.
SAW FILING GAGE.
APPLICATION FILED AUG. 9, 1919.
1,361,677.
Patented Dec. 7, 1920.
2 SHEETS—SHEET 2.
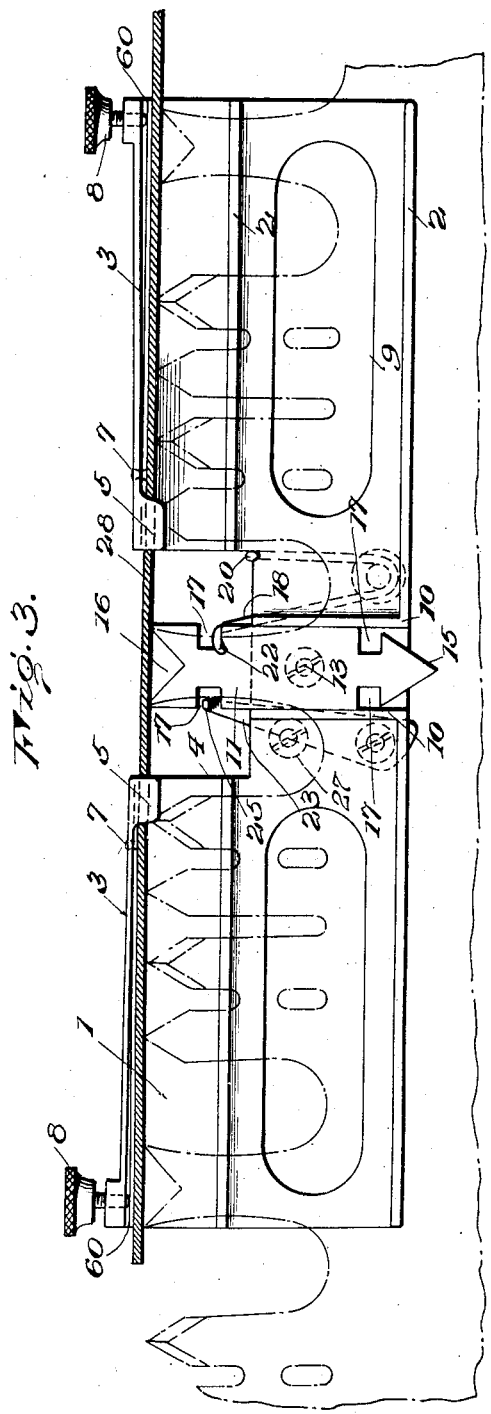
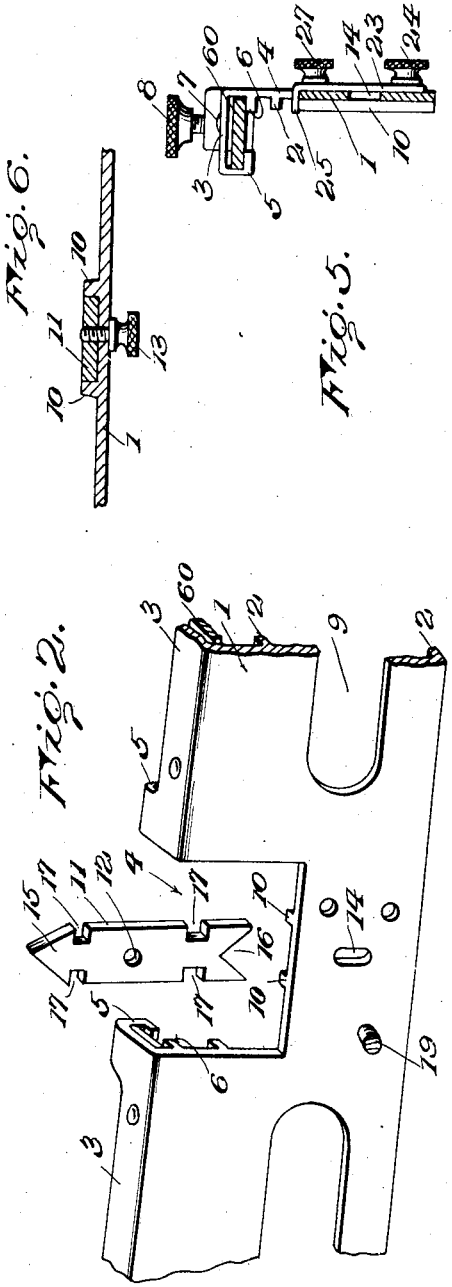
Inventor.
Samuel B. Brown.
by Lacey & Lacey, his Atty's

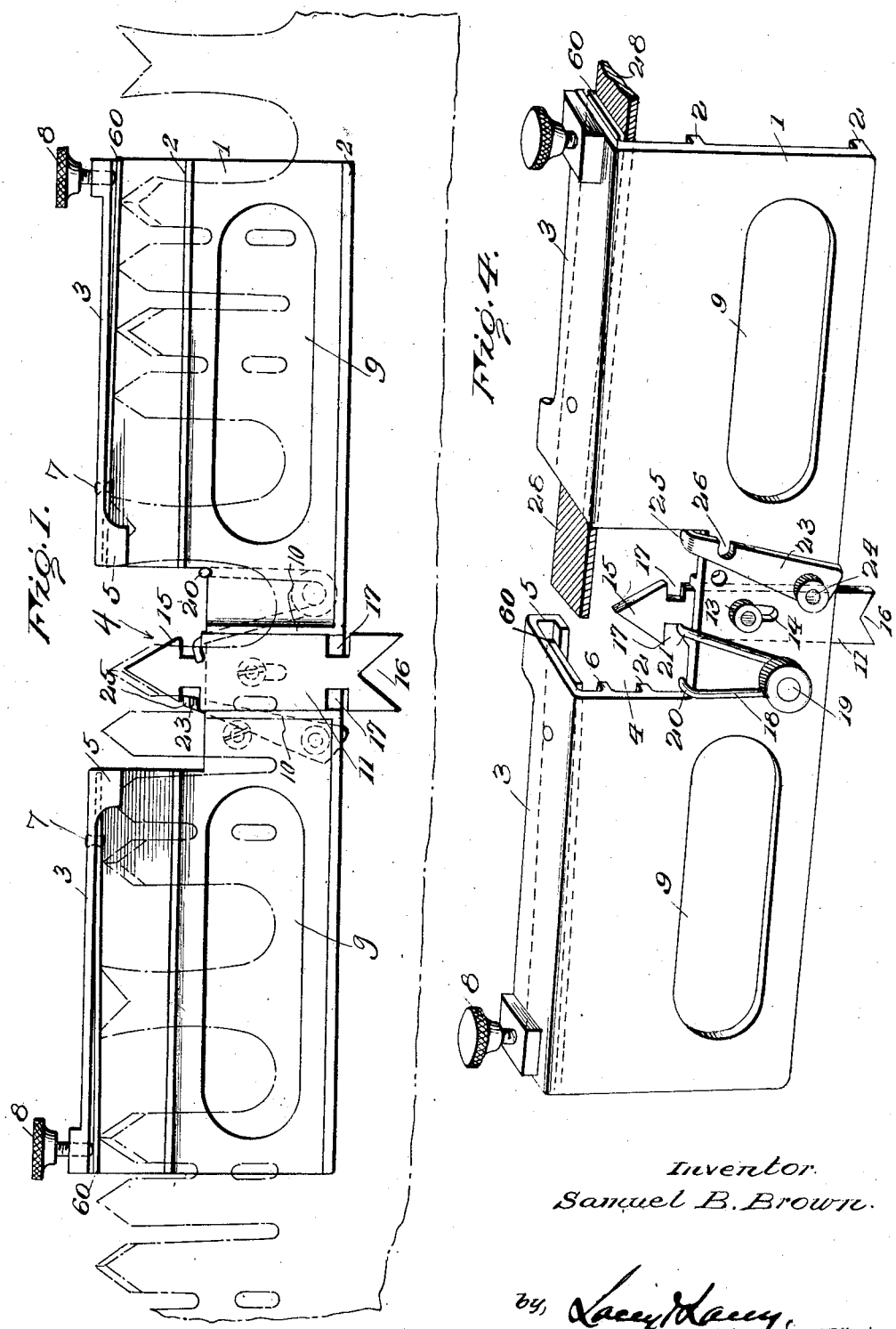

UNITED STATES PATENT OFFICE.

SAMUEL B. BROWN, OF CAIRO, ILLINOIS.

SAW-FILING GAGE.

1,361,677.  Specification of Letters Patent.  Patented Dec. 7, 1920.

Application filed August 9, 1919. Serial No. 316,376.

*To all whom it may concern:*

Be it known that I, SAMUEL B. BROWN, a citizen of the United States, residing at Cairo, in the county of Alexander and State of Illinois, have invented certain new and useful Improvements in Saw-Filing Gages, of which the following is a specification.

The object of this invention is to provide a simple, inexpensive and efficient device by the use of which the operation of filing and jointing a saw will be facilitated and certainty in the results attained assured. The invention seeks to provide a device more particularly designed for use upon cross-cut saws which may be very easily applied to and removed from the saw and which will be held against movement when in position on the saw. The invention also seeks to provide a device which will be capable of use upon the cutting teeth and also upon the rake teeth of the saw and which will be automatically adjusted relative to the saw teeth so that the gage will be properly centered upon the tooth to be filed. Other incidental objects of the invention will appear in the course of the following description, the novel features being particularly pointed out in the appended claims.

The invention is illustrated in the accompanying drawings, in which—

Figure 1 is an elevation of the gage showing a portion of a cross-cut saw in dotted lines;

Fig. 2 is a perspective view of the frame or base member of the device and the adjustable gage or pattern separated from the frame but approximately in its proper position relative thereto;

Fig. 3 is a view similar to Fig. 1 but showing the device arranged for use upon a rake tooth and also showing a jointer file in position;

Fig. 4 is a perspective view of the device removed from the saw and viewed from the side opposite that seen in Figs. 1 and 3, the gage being shown arranged for use in connection with a cutting tooth, the tooth-holding lever being shown in its inoperative position, and a portion of the jointer file being shown in position;

Fig. 5 is a transverse section of the device with the jointer file in place;

Fig. 6 is a detail horizontal section more particularly showing the manner of securing the gage or pattern member.

In carrying out the invention, I employ a frame or base member consisting of a flat plate 1 having longitudinal ribs 2 on one face against which the saw blade may rest and provided at its upper edge with lateral flanges 3. At the center of the base plate 1 is formed a recess 4 which extends through the flanges 3 so as to permit a file to be reciprocated transversely of the frame and act upon a saw tooth disposed within the said recess. At the inner ends of the flanges 3, which define the upper side walls of the recess 4, I form on the said flanges the extended underlying hook-like lugs 5 which are adapted to support the jointer file as will be presently set forth. On the face of the base plate, in position to coöperate with the said supports 5, are lugs 6 which, when the jointer file is in use, will extend under the same and furnish a fixed support therefor. Secured to the under sides of the flanges 3 are leaf springs 60 which are fixed at their inner ends by rivets 7 and at their outer ends are engaged by thumb screws 8 mounted in bearings formed therefor on the flanges 3 so that by adjusting the said thumb screws the springs may be flexed to conform to the crown or convex curve presented by the points of the saw teeth and the device thus properly positioned upon the saw to secure uniformity in the sharpening of the saw teeth. The longitudinal ribs 2 provide supports for the saw blade and also reinforce the base plate so as to prevent buckling of the same and, to reduce the weight of said plate, openings 9 are formed therein, as shown.

The upper ribs 2 terminate at the side walls of the recess 4 while the lower ribs extend inwardly beyond the planes of said side walls but terminate short of the center of the plate, and rising from the inner terminals of said lower ribs are vertical ribs 10 which constitute guides for the filing gage or pattern member 11. Said member 11 consists of a flat plate having straight side edges adapted to fit between the ribs 10 and be guided by the same and held thereby against lateral displacement, the plate being provided at its center with a threaded opening 12 to receive a thumb screw 13 which passes through a vertical slot 14 in the base plate between the ribs 10. It will be readily understood that the slot 14 permits the gage to be adjusted to the proper height accordingly as a rake tooth or a cutting tooth is to be filed and the screw 13 holds the gage securely in its set position. One end of the pattern member or filing gage is tapered, as shown at 15, so that it will correspond to the shape of the cutting teeth of the saw while the opposite end of said member is constructed with a V-shaped notch 16 conforming to the shape of the rake teeth of the saw so that, by removing the pattern or gage and inverting it, either end thereof may be brought into the operative position and the device quickly arranged for filing either the cutting teeth or the rake teeth. In the side edges of the pattern immediately adjacent the tapered end or head 15 and the notch 16, respectively, are notches 17 which accommodate holding devices mounted upon the base plate. The holding devices are disposed at opposite sides of the ribs 10 and are adapted to bear against the opposite edges of the tooth to be filed, one of said members consisting of a substantially U-shaped spring 18 secured to the base plate at its apex by a thumb screw 19 and having its terminals bent laterally so as to project over the edge of the base plate forming the bottom of the recess 4. One of said terminals, 20, bears against the side wall of the recess 4, as clearly shown in Figs. 1, 3 and 4, while the other terminal, 21, is adapted to yieldably engage the side edge of the tooth and is shaped to provide a small hook 22 to engage around the edge of the tooth and bear against the outer face thereof to thereby hold the tooth and the pattern in close contact through their opposed flat faces or sides. The pressure of the spring holding member against the tooth will tend to resist relative lateral movement of the tooth or the pattern so that the central line of the pattern will be held coincident with the central line of the tooth. The holding member 23 consists of a lever fulcrumed at its lower end upon a thumb screw 24, engaged in the base plate, and having its upper end provided with a finger 25 projecting over the edge of the base plate and adapted to bear against the adjacent edge of the saw tooth. This lever is provided near its upper end in one edge with a notch 26 through which may be engaged a thumb screw 27 which in operation is threaded into an opening provided therefor in the base plate adjacent the rib 10 so as to firmly hold the said lever in its operative position. When said thumb screw is removed, the member 23 may be moved from the tooth to the position shown in Fig. 4. It will be readily understood that the holding member or lever 23 by bearing against one side edge of the tooth coöperates with the terminal 21 of the holding device 18 to maintain the tooth with its central line coincident with the central line of the pattern and, therefore, the tooth will be properly shaped by the filing operation. It will also be understood that the notch 26 provides for a limited adjustment of the member 23 so as to accommodate its position to the width of the tooth. The gage or pattern is constructed of hardened steel so that it will be durable and will not be easily cut away by the file.

It is thought the manner of using the device will be readily understood. The gage or pattern member is disposed with the tapered end uppermost and the tool is then slipped over the saw blade with the hooked extremity 22 of the holding member 18 engaging the edge of the saw tooth to be filed. The lever holding member 23 is then brought against the edge of the tooth remote from the edge engaged by the extremity 22 and adjusted so as to bring the central longitudinal lines of the tooth and the pattern into coincidence, after which it is secured in that position by the thumb screw 27 as will be readily understood. The thumb screw 13 is then loosened to permit the vertical adjustment of the pattern after which said screw is tightened up to hold the pattern in its vertical adjustment, the pattern or gage being held against lateral movement by the ribs 10. The thumb screws 8 are then adjusted so that the springs 60 will conform to the crown of the saw blade after which an ordinary file is reciprocated across the working edges of the saw tooth until they are cut down to the lines defined by the edges of the upper end of the pattern. After all the cutting teeth have been filed, the pattern is reversed so as to bring its notched or V-shaped end 16 into the upper position and the rake teeth are then treated in the same manner. Before filing the teeth as described, the pattern member may be removed, if desired, and a jointing file 28 inserted beneath the flanges 3 and caused to rest upon the lugs 5 and 6, after which the thumb screws 8 are manipulated to secure the file firmly in place and to flex it so that it will conform to the proper crown of the saw blade. If the tool be then reciprocated longitudinally of the blade, the tips of the teeth will be reduced to the proper height to give the desired crown to the blade.

The notches 17 in the edges of the gage or pattern member facilitate the exact centering of the gage upon the tooth notwithstanding differences in the width of teeth upon different saws. If the tooth be wider than the gage, the holding devices will be free of the edges of the gage, but if the tooth be narrower than the gage the terminals of the holding devices will pass into the notches 17 to engage the tooth. The vertical adjustment of the pattern is to compensate for the difference between the length of the cutting teeth and the raker teeth and the notches 17 are located accordingly. Saw teeth are standardized in length and normally there is no pronounced longitudinal adjustment of the gage or pattern necessary to bring it into its proper operative position. When the end 15 of the pattern or gage is uppermost the thumb screw 13 will be at or near one end of the slot 14 and when the other end of the pattern or gage is uppermost the thumb screw will be at or near the opposite end of the slot. More frequently the members 18 and 23 will have their working ends disposed out of the notches in the pattern or gage plate but if the saw tooth should be narrower than is usual, the working ends of these members might approach more closely than would be permitted if the pattern was of its maximum width throughout its entire length between its working ends. This feature of the pattern will also be found advantageous in working upon those saws in which the raker teeth are wider than the cutting teeth, this difference in the widths of the teeth being frequently found.

My device is obviously simple in the construction and arrangement of its parts, may be produced at a low cost, and is efficient in use. It is to be understood that I do not restrict myself to the exact details shown in the annexed drawings as various changes may be made therein without departing from the spirit or scope of the invention as the same is defined in the following claims.

Having thus described the invention, what is claimed as new is:

1. A device for the purpose set forth comprising a frame adapted to be engaged upon a saw blade, and a pattern member mounted upon the frame and having a cutting tooth form at one end and a rake tooth form at the opposite end, said member being invertible at the side of the saw blade.

2. A device for the purpose set forth comprising a frame adapted to be engaged upon a saw blade, a pattern member mounted upon the frame, and means on the frame at opposite sides of said member for holding the same against and in registration with a saw tooth.

3. A device for the purpose set forth comprising a frame adapted to be engaged over a saw blade, means carried by said frame to rest upon and conform to the crown of the saw blade, and a pattern member mounted upon the frame to bear against a saw tooth.

4. A device for the purpose set forth comprising a frame adapted to be engaged upon a saw blade, a pattern member mounted on the frame to register with a saw tooth, crown conforming springs secured at their inner ends to the frame, and means for adjusting the outer ends of said springs to support the frame upon the crown of the saw blade.

5. A device for the purpose set forth comprising a frame adapted to be engaged upon a saw blade, a pattern member carried by the frame and having its end shaped to correspond to the end of a saw tooth, and holding members mounted on the frame at the opposite sides of the pattern and arranged to engage the edges of a tooth to hold the same in registration with the pattern.

6. A device for the purpose set forth comprising a frame adapted to be engaged over a saw blade, a pattern member mounted upon the frame and provided with notches in its side edges, means for securing said pattern in a set position against a saw tooth, and holding members mounted upon the frame at opposite sides of the pattern and having their ends bearing against the edges of the saw tooth, the said ends being in alinement with said notches whereby to engage narrow saw teeth.

7. A device for the purpose set forth comprising a frame, a pattern mounted on the frame and provided with notches in its side edges, means for securing the pattern in a set position upon the frame, a lever holding member mounted on the frame at one side of the pattern and having its terminal in alinement with a notch in the adjacent edge of the pattern and adapted to bear against an edge of a saw tooth, means for securing said lever in a set position, and a yieldable holding device mounted upon the frame at the opposite side of the pattern and having a terminal in alinement with a notch in the adjacent edge of the pattern and adapted to engage around an edge of a saw tooth.

In testimony whereof I affix my signature.

SAMUEL B. BROWN. [L. S.]